(12) United States Patent
Sharma

(10) Patent No.: US 7,532,203 B2
(45) Date of Patent: May 12, 2009

(54) DATA INPUT DEVICE THAT UTILIZES A LAYER OF MAGNETIC PARTICLES TO STORE NON-VOLATILE INPUT DATA THAT IS MAGNETICALLY COUPLED TO AN UNDERLYING MRAM ARRAY

(75) Inventor: Manish Sharma, Sunnyvale, CA (US)

(73) Assignee: Samsung Electronic Co., Ltd. (KR)

( * ) Notice: Subject to any disclaimer, the term of this patent is extended or adjusted under 35 U.S.C. 154(b) by 634 days.

(21) Appl. No.: 10/831,110

(22) Filed: Apr. 26, 2004

(65) Prior Publication Data

US 2005/0237309 A1 Oct. 27, 2005

(51) Int. Cl.
*G09G 5/00* (2006.01)
(52) U.S. Cl. .................. 345/173; 345/179; 178/18.01
(58) Field of Classification Search .................. 345/156, 345/157, 158, 159, 173–178, 179; 178/18.03, 178/19.01, 19.02, 19.03, 18.01–18.11
See application file for complete search history.

(56) References Cited

U.S. PATENT DOCUMENTS

| | | | |
|---|---|---|---|
| 4,929,935 A | 5/1990 | Rysavy et al. | |
| 5,051,736 A | 9/1991 | Bennett et al. | |
| 5,170,348 A | 12/1992 | Hirose | |
| 5,243,317 A | 9/1993 | Chen et al. | |
| 5,554,828 A | 9/1996 | Primm | |
| 5,576,502 A | 11/1996 | Fukushima et al. | |
| 5,627,348 A | 5/1997 | Berkson et al. | |
| 5,630,168 A | 5/1997 | Rosebrugh et al. | |
| 5,640,343 A | 6/1997 | Gallagher et al. | |
| 5,734,130 A | 3/1998 | Baker | |
| 5,793,697 A | 8/1998 | Scheuerlein | |
| 5,956,020 A | 9/1999 | D'Amico et al. | |
| 6,031,569 A | 2/2000 | Nobuoka et al. | |
| 6,097,626 A | 8/2000 | Brug et al. | |
| 6,130,814 A * | 10/2000 | Sun | 361/143 |
| 6,163,477 A | 12/2000 | Tran | |
| 6,256,224 B1 | 7/2001 | Perner et al. | |
| 6,385,111 B2 | 5/2002 | Tran et al. | |
| 6,404,647 B1 | 6/2002 | Minné | |
| 6,539,117 B2 | 3/2003 | Carau, Sr. | |
| 6,567,299 B2 | 5/2003 | Kunikiyo et al. | |
| 6,587,370 B2 | 7/2003 | Hirai | |
| 6,621,501 B2 | 9/2003 | Morrison | |
| 6,760,016 B2 | 7/2004 | Sharma | |
| 6,781,578 B2 | 8/2004 | Sharma | |
| 6,798,404 B2 | 9/2004 | Sharma | |
| 6,858,991 B2 * | 2/2005 | Miyazawa | 345/204 |
| 6,877,074 B2 * | 4/2005 | Naitoh et al. | 711/154 |
| 6,940,153 B2 * | 9/2005 | Spencer et al. | 257/659 |
| 2004/0253437 A1* | 12/2004 | Ingvarsson et al. | 428/329 |

\* cited by examiner

*Primary Examiner*—David L Lewis
(74) *Attorney, Agent, or Firm*—Myers Bigel Sibley & Sajovec

(57) ABSTRACT

An input device includes a plurality of MRAM cells and a layer of particles. An MRAM cell in the input device includes a sense layer having a magnetic orientation. At least one particle of the layer of particles is located near the MRAM cell such that the particle affects the magnetic orientation of the sense layer of the MRAM cell.

39 Claims, 8 Drawing Sheets

DATA INPUT DEVICE THAT UTILIZES A LAYER OF MAGNETIC PARTICLES TO STORE NON-VOLATILE INPUT DATA THAT IS MAGNETICALLY COUPLED TO AN UNDERLYING MRAM ARRAY

BACKGROUND

Digitizer systems are well known to those skilled in the art. Typically, an electromagnetic digitizer array, or other type of system, is responsive to a stylus used by a user to enter data directly upon the digitizer array and to control various computer functions by writing, sketching, or pointing the stylus against the digitizer array. Some examples of digitizer systems locate the digitizer array directly on a monitor and other examples separate the two devices. Usually, the separate digitizer systems are utilized where a relatively large work surface is needed when compared to the size of the display device such as a monitor screen. Integrated digitizer and display devices are utilized where portability and size are important. As such, various types of computer systems utilize stylus-based technologies and may include portable systems, desktop systems, transportable, or terminal-based systems.

The integrated digitizer-display systems are integrated only in the sense that they are coplanar and are fitted together with a monitor or display in a common device. They are not integrated in that a signal processor is required to convert the signals generated by the digitizer into display signals compatible with the display. Thus, additional circuitry is involved in even the simplest of digitizer-display systems that are integrated for direct input to the same display surface where the digitizer is located.

In addition to requiring additional circuitry, another disadvantage of conventional digitizer systems is excessive energy consumption. For example, conventional digitizer systems typically require the digitizing array to always be powered to receive input from a user's stylus. Furthermore, the user must also save the input information to long-term storage, such as a hard disk drive or other energy-consuming non-volatile memory on the computing system, in order to preserve the input information. Excessive power consumption tends to increase costs and may reduce the battery lifetime if the digitizer system is provided in a portable computing system.

SUMMARY

In accordance with an example, an input device includes a plurality of MRAM cells. Each MRAM cell of the input device includes a sense layer having a magnetic orientation. A layer of particles is located near the MRAM cells such that at least one of the particles affects the magnetic orientation of the sense layer of at least one of the plurality of cells.

BRIEF DESCRIPTION OF THE DRAWINGS

The embodiments are illustrated by way of example and without limitation in the accompanying figures in which like numeral references refer to like elements, and wherein.

DETAILED DESCRIPTION

Figure 1:
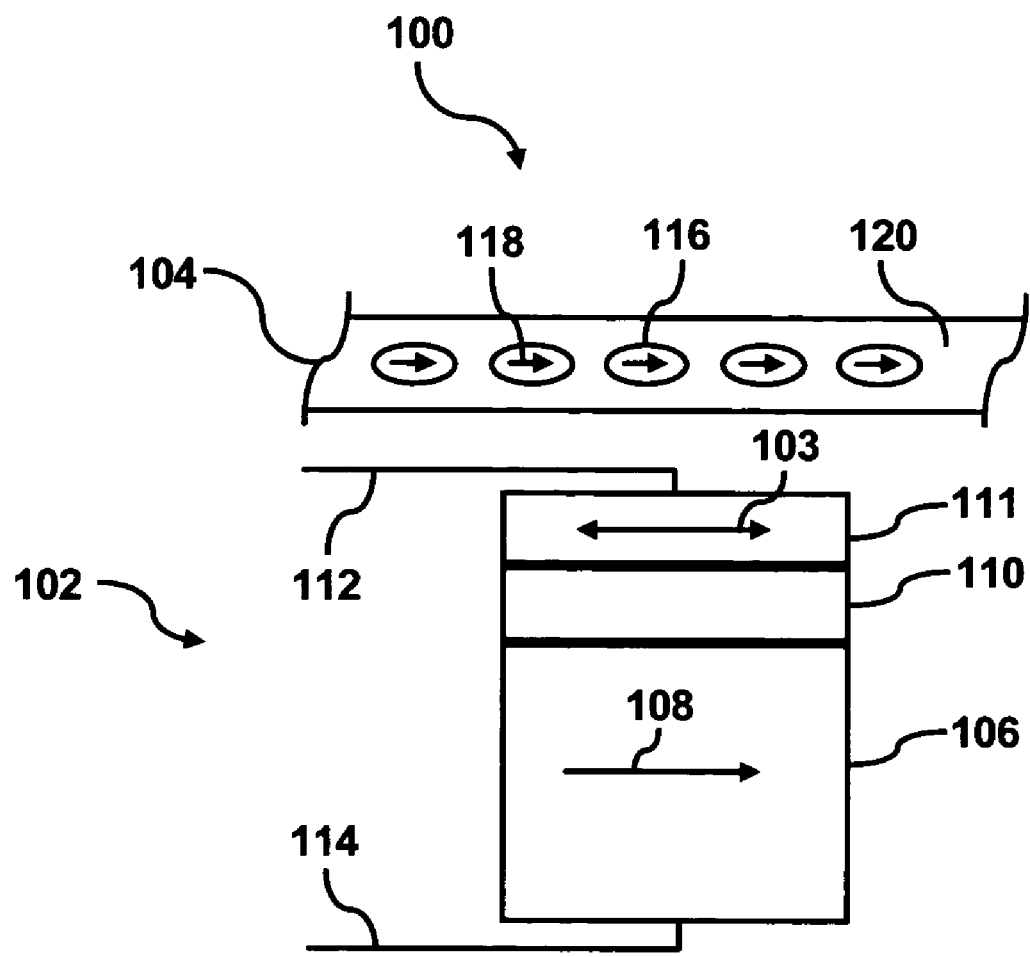
FIG. 1 shows a schematic diagram of one cell and a layer of particles in accordance with an example.

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In other instances, well known methods and structures have not been described in detail so as not to unnecessarily obscure the embodiments.

An input device includes a layer of particles that stores user input information in a non-volatile manner. In one example, the input device is a digitizer system that accepts user input information generated, for example, using a stylus, and stores the user input information in the layer of particles. The input device may be configured as a separate unit which communicates with a processor of an electronic device or integrated with the electronic device. Examples of devices in which the input device may be used are a portable digital assistant, a computer, a digital notepad, a cellular telephone, a kiosk, or any other electronic device requiring user input. The input device, when integrated with an electronic device may include a control unit configured to communicate with a processor of the electronic device. Additionally, instead of using a control unit controlling the functions of the integrated input device, the processor of the electronic device may be programmed to control the functions of the integrated input device. In any configuration, the control unit or processor reads user input and performs operations requested by the user input. Examples of operations include power control, display control, text input, hand-written input, drawing functions, color selection, initialization or any other device function. Throughout the present disclosure, the input device may sometimes be referred to as the apparatus.

Throughout the present disclosure, reference is made to "a layer of particles". The layer of particles may be a plurality of magnetic or magnetically charged particles suspended in a medium contained in an enclosure. The layer of particles may also be a plurality of magnetic particles having an electrostatic charge suspended in a medium contained in a flat enclosure. Additionally, the particles may be mixed in type, for example, some particles may be magnetic whereas others may be magnetic with an electrostatic charge. The particles may also be mixed in size, shape, texture or composition. The medium may be a fluid (water based, hydrocarbon based, or the like), a polymer, a gel, a colloidal suspension or the like. Any medium will suffice as long as the particles may spin, rotate or turn thus changing magnetic orientation in the medium. The flat enclosure may be rigid or flexible. The combination of particles, medium and enclosure may take various forms as those of ordinary skill in the art would recognize.

In one example, the input device is configured to read user input from an electromagnetic generating device, which may include a stylus or another device operable to generate an electromagnetic field. The input device includes a plurality of cells arranged in a pattern which may be a matrix. Each cell is configured as a magnetic random access memory (hereinafter referred to as "MRAM") cell and includes a reference layer with a magnetic orientation and field, a barrier layer positioned adjacent to the reference layer, and a magnetic sense layer adjacent to the barrier layer. Each cell is electrically connected to a control unit for providing a voltage and reading current flowing through each cell. The plurality of cells is covered by the layer of particles having a plurality of magnetic or magnetically charged particles with or without an electrostatic charge. The effect of the magnetic charge of the particles affects the orientation of the magnetic field of the sense layer. A change in the magnetic orientation of the sense layer relative to that of the reference layer appears as a change in the resistance of the MRAM cell.

The configuration of the MRAM cells covered by the layer of particles provides a significant benefit to the construction and operation of the apparatus. The layer of particles is located near the MRAM cells in the input device but is not necessarily directly attached to the MRAM cells. The distance from the MRAM cells to the layer of particles is dependent at least in part on the strength of a magnetic field of the particles in the layer of particles and the strength of a magnetic field generated by a sense layer in each of the MRAM cells detecting the state of the particles. The magnetic field of the sense layers of the MRAM cells is affected by a change in magnetic orientation of the particles in the layer of particles for detecting the state of the particles. The layer of particles may be located within a maximum predetermined distance from the MRAM cells such that the sense layers of the MRAM cells can detect the change in magnetic orientation of the particles. Thus, the MRAM cells may be constructed separately from the layer of particles reducing the costs of production. Additionally, a single particle may overlay or partially overlay a single cell. Alternatively, multiple particles may overlay a single cell. Accordingly, the MRAM cells may be arranged in a variety of configurations or a variety of sizes without regards to the arrangement or size of particles used in the layers or particles. This reduces costs for custom products by allowing the use of one layer of particles which may be mass produced for various arrangements of MRAM cells.

Additionally, the layers of particles may be initialized by an external magnetic field, electrostatic field or a simple circuit arrangement which applies a voltage to the layer. This reduces the number of electrical connections and circuitry required for the arrangement of MRAM cells and thus further reduces the costs of production. It also reduces the power required by the apparatus which is especially beneficial in battery operated products.

In the sense operation, the layer of particles is initialized by applying an electrical, electrostatic or magnetic field. This operation causes the particles to spin, rotate or turn and assume substantially the same magnetic orientation. The control unit applies a voltage to each MRAM cell and monitors the current flowing through each MRAM cell. The current flowing through each MRAM cell is proportional to the voltage applied divided by its resistance. The resistance of each MRAM cell is determined by the strength of the magnetic field of the sense layer. A user then changes the orientation of one or multiple particles thus causing the magnetic field of the sense layer of the MRAM cell or cells under these particles to change in orientation. This causes a change in resistance of the MRAM cell or cells under these particles. The control unit determines the change in resistance, for example, by monitoring the current flowing through the MRAM cells. The control unit then processes the user input detected in the above disclosed manner.

In another example, the input device may be integrated with a display of an electronic device having a plurality of pixels. Some or all of the pixels may be electrically connected to and controlled by the MRAM cells in a one-to-one, one-to-many or many-to-one manner. As described above, a user may change the orientation of one or multiple particles in the particle layer, causing MRAM cells detecting the state of the changed particles to change in resistance. This change in resistance or resulting change in voltage may be used to control the state of pixels electrically connected to the MRAM cells. In this manner, a pixel is directly turned on or off through operation of an MRAM cell. Alternatively, the control unit may detect the user input and send a signal to the processor of the device. The processor of the device may then control the corresponding pixel, turning it on or off. A more detailed description of MRAM cells integrated with a display may be found in U.S. patent application Ser. Nos. 10/038466 and 10/037028 both filed on Jan. 2, 2002, these applications are assigned to the assignee of the embodiments described herein and are incorporated by reference herein in their entirety.

With reference first to FIG. 1, there is shown a schematic diagram of an apparatus 100 with one MRAM cell 102 and a layer of particles 104. The MRAM cell 102 includes a reference layer 106 having a magnetic field in an orientation designated by arrow 108. A barrier layer 110 overlays the reference layer 106. A sense layer 111 overlays the barrier layer 110. Conductors are connected to the MRAM cell 102 to measure the change in resistance of the MRAM cell. For example, a conductor 112 electrically connects the sense layer 111 to a control unit 602 shown in FIG. 6. A conductor 114 electrically connects the reference layer 106 to the control unit 602.

Figure 3:
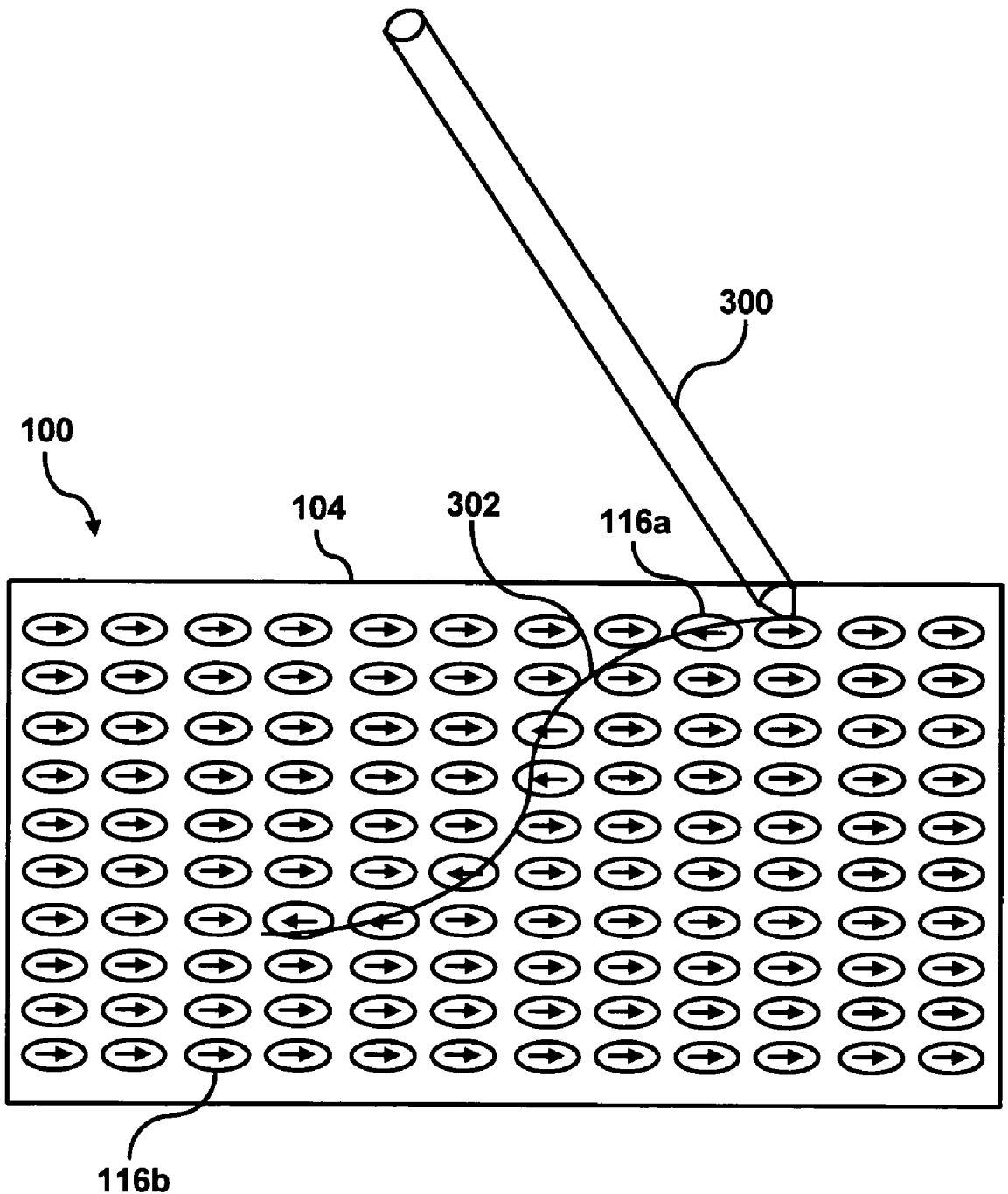
FIG. 3 shows a schematic diagram of a magnetic field generating device interacting with an apparatus in accordance with an example.

The layer of particles 104 overlays the MRAM cell 102 and includes a plurality of particles 116 having a magnetic orientation designated by arrow 118. The particles 116 are suspended in a medium 120. The orientation of the particles may be changed, for example, by user input, such as shown in FIG. 3.

A magneto-resistive effect provides the resistance of the MRAM cell 102. The barrier layer 110 may be constructed of various materials to provide different types of magneto-resistive effects including but not limited to a giant magneto-resistive effect, a magnetic tunneling junction effect or a colossal magneto-resistive effect. The reference layer 106 of the MRAM cell 102 may be a layer of magnetic material with a fixed or pinned magnetic orientation in a predetermined direction, such as shown as orientation 108. The sense layer 111 may be a layer of magnetic material with a changeable orientation. The orientation of the sense layer 111 is shown as orientation 103, which may change in direction depending on the orientation of the particles 116 overlaying the MRAM cell 102. The logic state of the MRAM cell 102 depends upon the magnetic orientations of the reference layer 106 and sense layer 111. For example, when a voltage is applied across the MRAM cell 102, electrons migrate between the sense layer 106 and the reference layer 111 through the barrier layer 110 creating a magnetic tunnel junction. The phenomena that causes the migration of electrons through the barrier layer 110 may be referred to as quantum mechanical tunneling or spin tunneling. The amount of electrons or current flowing through the MRAM cell 102 depends upon the magnetic orientation of the sense layer 111 because the magnetic orientation of the reference layer 106 is fixed or pinned. When the magnetic orientations of the sense layer 111 and the reference layer 106 are aligned a first amount of current flows through the MRAM cell 102, representing a first logic state. When the magnetic orientations are not aligned, such as shown in FIG. 1, a different amount of current flows through the MRAM cell 102, representing a second logic state. Accordingly, the logic state of the MRAM cell 102 may be measured and represented as a change in resistance.

The logic state of the MRAM cell 102 is dependent on the magnetic orientation of one or more particles 116 in the layer of particles 104. Thus, the MRAM cell 102 is used to detect the state, i.e., magnetic orientation, of the particles 116 overlaying the MRAM cell 102. In one example, the magnetic orientation of the particles 116 of the layer of particles 104 changes, for example, as a result of user input, causing the magnetic orientation of the sense layer 111 to change. The change in magnetic orientation of the sense layer 111 can be measured by applying a voltage to the MRAM cell 102 and measuring the change in resistance.

FIG. 1 shows at least two particles 116 aligned over the MRAM cell 102 as an example. However, any number of particles 116 may be aligned over the MRAM cell 102. For example, the particles 116 may be very small in comparison to the MRAM cell 102 corresponding to a plurality of particles 116 per MRAM cell 102. Alternatively, the particles 116 may be large in comparison to the MRAM cell 102 such that each particles 116 covers a plurality of MRAM cells 102.

The MRAM cell 102 has electrically defined properties including a resistance that may be measured by applying a voltage via conductors 112 and 114 and measuring the current. The resistance of the MRAM cell 102 varies according to the strength of the magnetic field of the reference layer 106 and the strength of the magnetic field of the reference layer 106 varies according to magnetic orientation of the sense layer 111 which is affected by the magnetic orientation of the particles 116 aligned over or located near the MRAM cell 102. Thus, the state of the particles 116, which is related to the magnetic orientation of the particles 116, determines the amount of resistance of the MRAM cell 102. This arrangement provides a non-volatile memory cell with the state of the particles representing the storage of a "1" or "0" in an MRAM cell. The arrangement is non-volatile because, even if the power were removed from the control unit 602, the particles 116 of the layer of particles 104 retain there data by maintaining their magnetic orientation, that is, they maintain their state. Once power is reapplied, the MRAM cell 102 may read the state of the particles 116.

Figure 2:
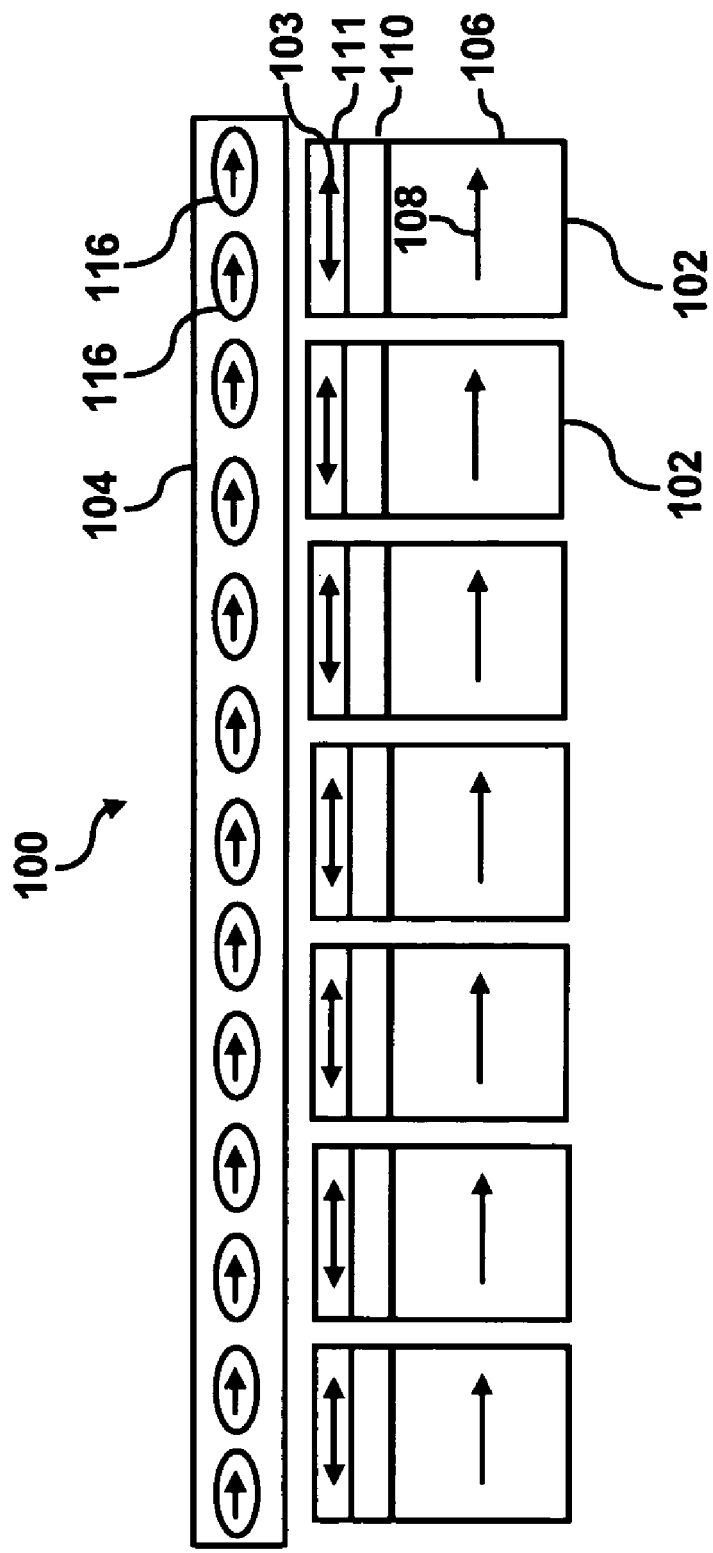
FIG. 2 shows a schematic diagram of a plurality of cells and a layer of particles in accordance with an example.

FIG. 2 shows a schematic diagram of a plurality of MRAM cells 102 and a layer of particles 104. The particles 116 in the layer of particles 104 distribute due to repelling and attraction magnetic forces or electrostatic charges after the layer of particles is produced. The locations of the particles 116 in the layer of particles 104 is generally maintained due to repelling and attraction magnetic forces or electrostatic charges. In this example, at least one particle 116 overlies or is near each MRAM cell 102. However, multiple particles 116 may overlay each MRAM cell 102.

A baseline of resistances may be used to read the layer of particles 104 using the MRAM cells 102. The base line of resistances may be used as a reference such that a measured resistance of a MRAM cell 102 greater or less than the base line resistance is associated with a "1" or "0" stored in a particle 116 associated with the MRAM cell 102. This arrangement allows for the use of various sizes of MRAM cells 102 and various sizes of particles 116 in the layer of particles 104 because the layer of particles 104 is separate from the MRAM cells 102 thus providing significant costs savings in production as discussed above.

FIG. 3 shows a schematic diagram of a magnetic field generating device 300 interacting with the apparatus 100. A user may trace a path designated by line 302 over the layer of particles 104 with the magnetic field or electrostatic field generating device 300. This action causes the particles 116a to turn or spin thus changing the magnetic orientation of the particles 116a while the remaining particles 116b remain unchanged. The control unit 602 shown in FIG. 6 may read all of the MRAM cells 102 located under the layer of particles 104 to determine the users described path designated by line 302. The control unit 602 or other processor interprets the input and performs an action requested by the user.

In an embodiment, the magnetic field or electrostatic field generating device 300 may generate a magnetic field and may be configured as a stylus with a permanent magnet located near the tip. Alternatively, the stylus may include an electromagnetic and associated circuitry and switches for controlling the magnetic orientation of the electromagnetic. In a similar manner to writing a line as described above, a user may erase by reorienting the magnetic field of the changed particles 116a by changing the magnetic orientation of the electromagnet and bringing the stylus in contact with the particles 116a. Alternatively, the user may be supplied with two magnetic field generating devices or styluses having a permanent magnetic with opposite magnetic orientations such that one stylus is used for writing and the other used for erasing. In addition, a single stylus may be provided with a permanent magnet located at each end and having opposite orientations. It should be understood that various magnetic field generators other than a stylus may also be used. For example, a bar magnet or other permanent magnet attached to a handle may perform the same functions as described above.

In another embodiment, the magnetic field or electrostatic field generating device 300 may generate a electrostatic field and may be configured as a stylus with a electrostatic charged tip. When the particles 116 are magnetic and include an electrostatic charge, the electrostatic charged tip acts on the particles 116 (attracts or repels the particles 116) and causes them to rotate or turn thus changing the magnetic orientation of the particles 116. It should be understood that various electrostatic field generators other than a stylus may also be used.

Figure 4:
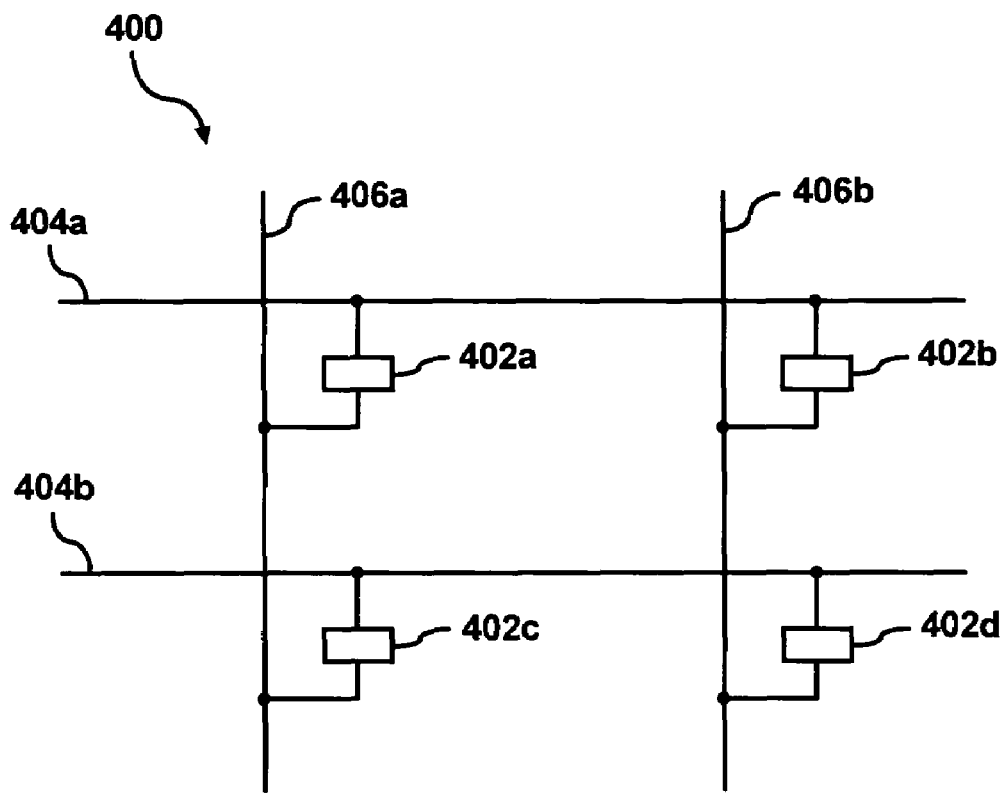
FIG. 4 shows a simplified circuit diagram of an array of MRAM cells in accordance with an example.

FIG. 4 shows a simplified circuit diagram 400. The circuit diagram 400 shows four MRAM cells 402a-d arranged in a matrix configuration. The matrix configuration includes two row lines 404a-b and two column lines 406a-b. The MRAM cell 402a is electrically connected to row line 404a and column line 406a. The MRAM cell 402b is electrically connected to row line 404a and column line 406b. The MRAM cell 402c is electrically connected to row line 404b and column line 406a. The MRAM cell 402d is electrically connected to row line 404b and column line 406b. In this configuration, the control unit 602 may apply a voltage to row line 404a or 404b and to column line 406a or 406b and read the flow of current through each cell 402a-d. The operation may be performed in a cell by cell manner by activating row line 404a and column line 406a to thus read MRAM cell 402a. In a similar manner, all cells in the matrix may be read. It should be noted that FIG. 4 is shown for illustrative purposes and any number of MRAM cells may be used along with corresponding row and column lines.

Figure 5:
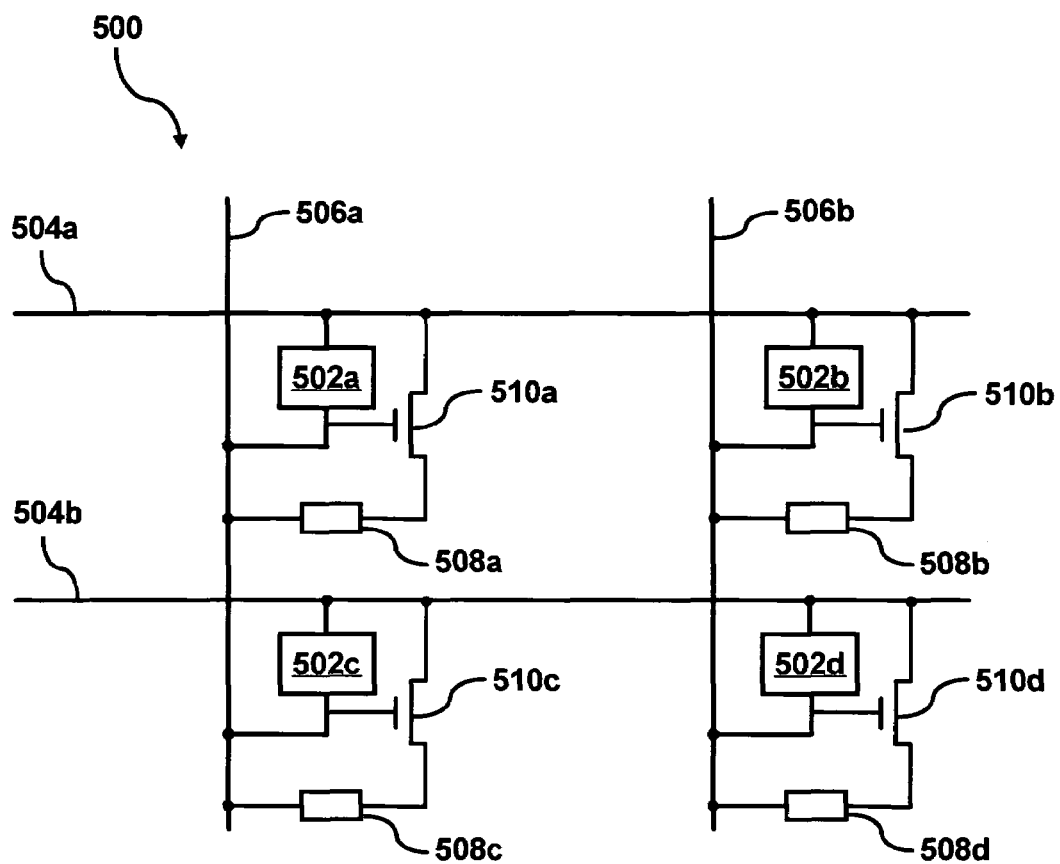
FIG. 5 shows a simplified circuit diagram of an array of MRAM cells integrated with pixels of a display in accordance with an example.

FIG. 5 shows a simplified circuit diagram 500. The circuit diagram 500 shows four MRAM cells 502a-d arranged in a matrix configuration. The matrix configuration includes two row lines 504a-b and two column lines 506a-b. The MRAM cell 502a is electrically connected to row line 504a and column line 506a. The MRAM cell 502b is electrically connected to row line 504a and column line 506b. The MRAM cell 502c is electrically connected to row line 504b and column line 506a. The MRAM cell 502d is electrically connected to row line 504b and column line 506b. Additionally, four pixels 508a-d of a display are arranged in the same matrix configuration and connected in the same manner as the four corresponding MRAM cells 502a-d.

Referring to pixel 508a, the operation of a single pixel will be described. Pixel 508a is powered by row line 504a and column line 506a through a control switch 510a. The control switch 510a may be a transistor or any other switching circuitry. When particles overlaying the MRAM cell 502a are in an initialized state, the control switch 510a is turned off and thus the pixel 508a is off. When particles overlaying the MRAM cell 502a are changed by the user, the control switch 510a is turned on and thus the pixel 508a is on. In this manner, each MRAM cell 502a-d directly control each pixel 508a-d respectively. It should be noted that FIG. 5 is shown for illustrative purposes and any number of MRAM cells and corresponding pixels may be used along with corresponding row and column lines. Alternatively, any number of MRAM cells may be connected to only some of the pixels.

Figure 6:
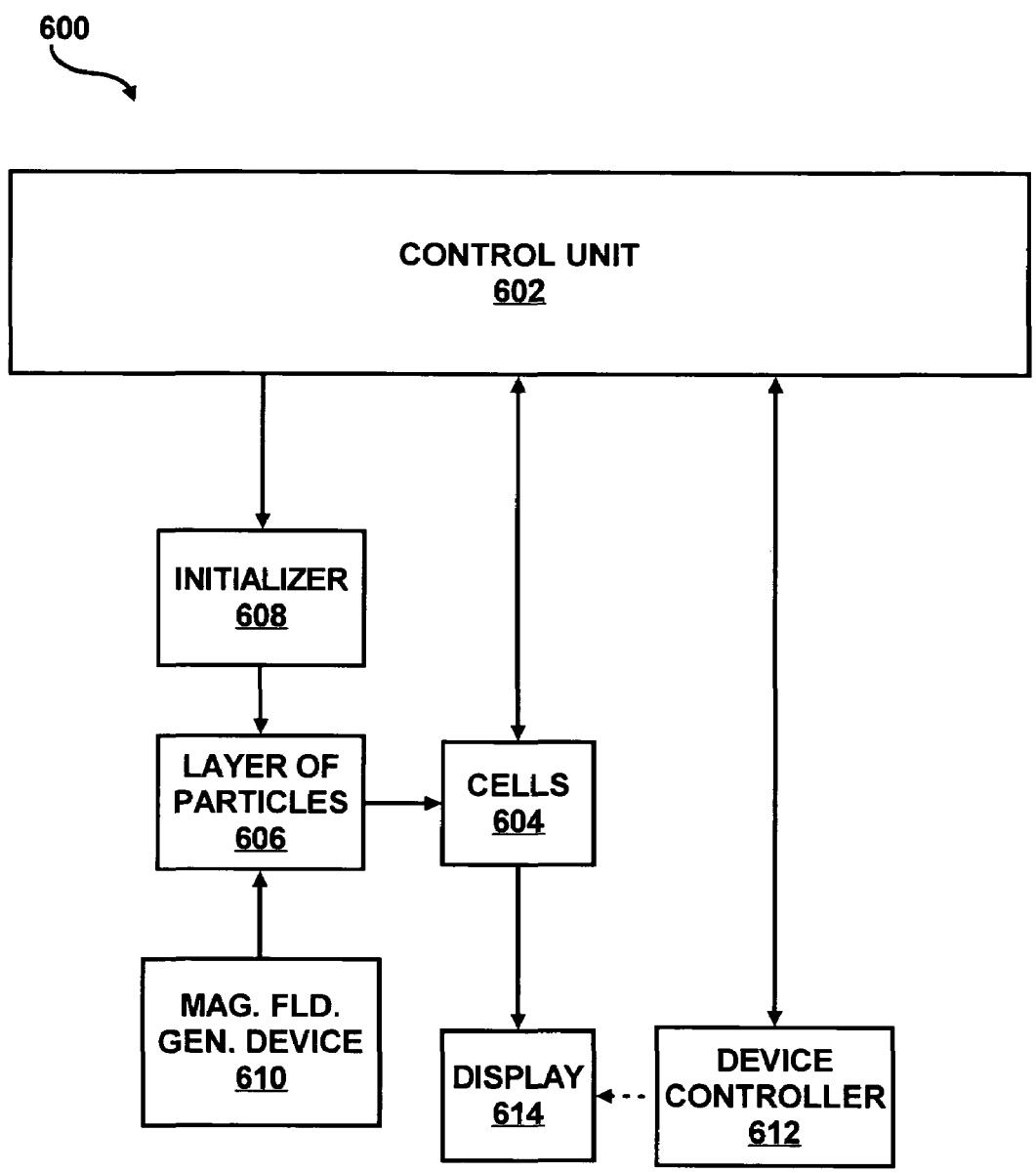
FIG. 6 shows a block diagram of a control scheme in accordance with an example.

Referring to FIG. 6, there is illustrated a block diagram of an exemplary control scheme 600. The following description of the control scheme 600 is one manner in which the apparatus 100 may be operated. In this respect, it is to be understood that the following description of the control scheme 600 is but one manner of a variety of different manners in which such an apparatus may be operated. According to this example, the control scheme 600 includes a control unit 602, a plurality of cells (MRAM cells) 604, a layer of particles 606, an initializer 608 and a magnetic field generating device 610. The control scheme 600 may also include a processor or device controller 612 and a display 614 having a plurality of pixels.

The control unit 602 is generally configured to control and communicate with the plurality of cells 604, the initializer 608 and the device controller 612. The control unit 602 reads the resistive states of each cell in the plurality of cells 604 and translates this information into a user input request or action. The control unit 602 may pass this action or request to the device controller 612 causing the device to take a particular action. In addition, the control unit 602 may initiate an initialization action by signaling the initializer 608 to initialize the layer of particles 606. The initializer 608 is responsible for initializing the layer of particles 606 by aligning the magnetic orientation of each particle in substantially the same direction or alternatively charging each particle to the substantially the same charge. For example, the initializer 608 may apply a voltage to the layer of particles 104 causing the particles 116 to substantially align or achieve substantially the same charge.

The magnetic field generating device 610, under control of a user, acts to change the orientation of the magnetic field of the particles 116 in the layer of particles 606. If the magnetic particles 116 also include an electrostatic charge, an electrostatic field generating device may be used in place of the magnetic field generating device 610. The layer of particles 606 affects the strength of the magnetic fields of the plurality of MRAM cells 604 which are read by the control unit 602. The change in strength changes the resistance of the MRAM cells 604 which is then measured by the control unit 602 to read the data stored by the layer of particles 606.

In one example, one of the cells in the plurality of cells 604 may control one or more pixels in the display 614. In this arrangement, a user changes the magnetic orientation of at least one of the particles in the layer of particles 606, causing a resistance change in at least one of the cells in the plurality of cells 604 which may be read by the control unit 602. However, one of the pixels, in this example, is electrically connected to the cell and changes state from on to off or vice-versa in response to the resistance change. In this manner, each pixel of the display may be directly controlled by the plurality of cells 604 without requiring an additional display processor or the need for the device controller 612 to operate the display 614.

Alternatively, one of the cells in the plurality of cells 604 may indirectly control one or more pixels in the display 614. In this arrangement, a user changes the magnetic orientation of at least one of the particles in the layer of particles 606, causing a resistance change in at least one of the cells in the plurality of cells 604 which may be read by the control unit 602. The control unit 602 passes this information to the device controller 612 or display processor (not shown). The device controller 612 then changes state of one of the pixels in the display from on to off or vice-versa. In this manner, each pixel of the display 614 may be indirectly controlled by the plurality of cells 604 without requiring a direct electrical connection between the cells 604 and the display 614.

The control unit 602 may be implemented as application specific hardware or as a microprocessor operating a program carrying out the functions of the control unit 602. In the latter case, microprocessor may be interfaced with memory having stored therein a program for operating the apparatus 100. The memory may be operated as a combination of volatile and non-volatile memory, such as dynamic random access memory (DRAM), EEPROM, flash memory, and the like.

Figure 7:
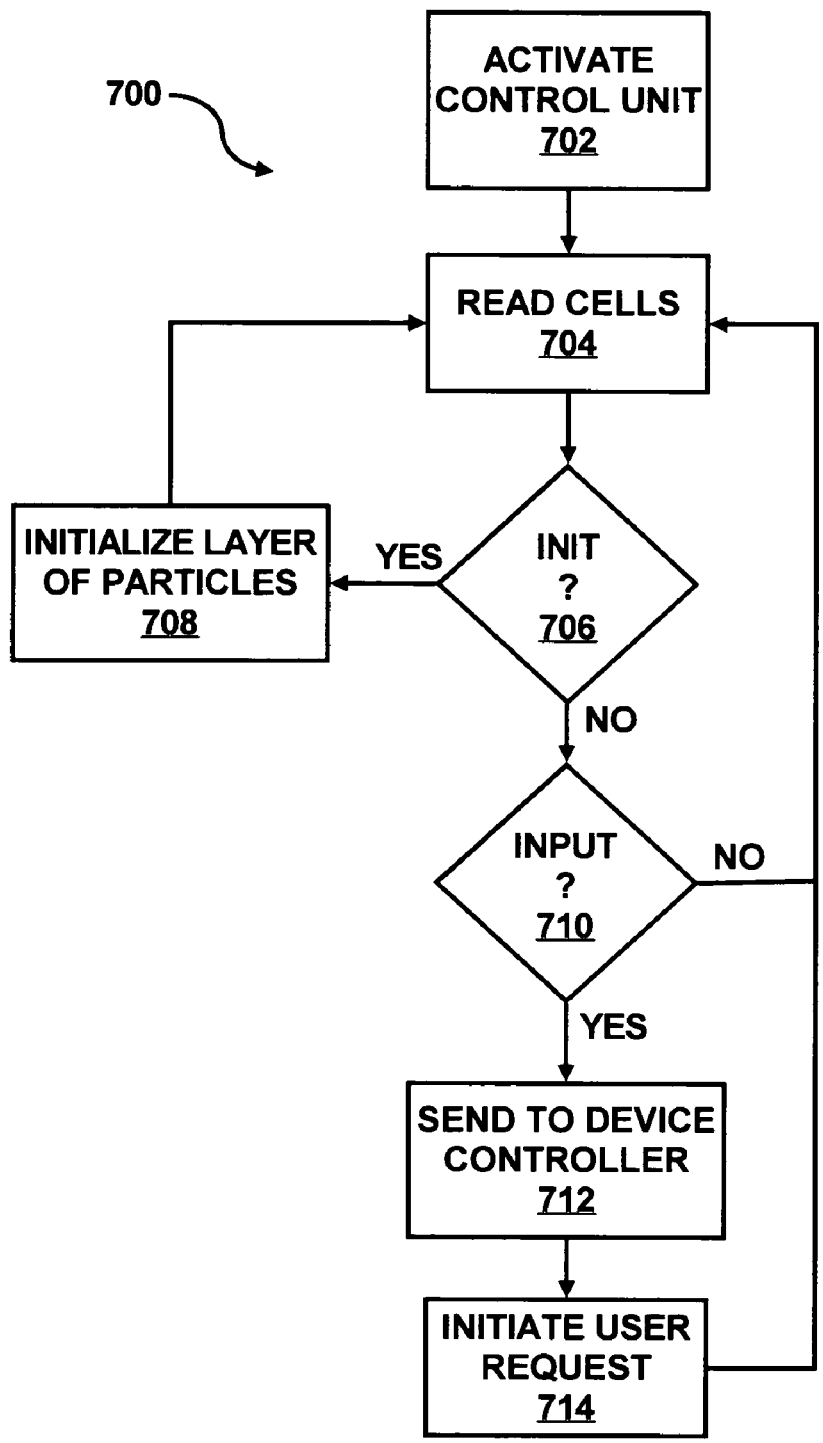
FIG. 7 shows a flow diagram of an operational mode of an apparatus in accordance with an example.

FIG. 7 shows a flow diagram of an operational mode 700 depicting a manner in which an apparatus may be implemented. The following description of the operational mode 700 is made with reference to the block diagram 600 illustrated in FIG. 6, and thus makes reference to the elements cited therein. The following description of the operational mode 700 is one manner in which the apparatus 100 may be implemented. In this respect, it is to be understood that the following description of the operational mode 700 is but one manner of a variety of different manners in which such an apparatus may be operated.

In the operational mode 700, the control unit 602 is activated in step 702. The control unit 602 then reads the states of the particles in the layer of particles 606 by determining the resistance of each cell in the plurality of cells 604 in step 704. The control unit 602 determines, whether the layer of particles 606 should be initialized by the initializer 608 in step 706. For example, a user may perform an operation causing or requesting initialization. If initialization is required, the initializer 608 initializes the layer of particles 606 in step 708. Alternatively, step 708 may be carried out later in the process. If initialization is not required, the control unit 602 determines if there is any user input in step 710. If there is user input, the input information is sent to the device controller 612 in step 712. If there is no user input, control flows back to step 704. The device controller 612 then interprets the user input and initiates the user's request in step 714.

Figure 8:
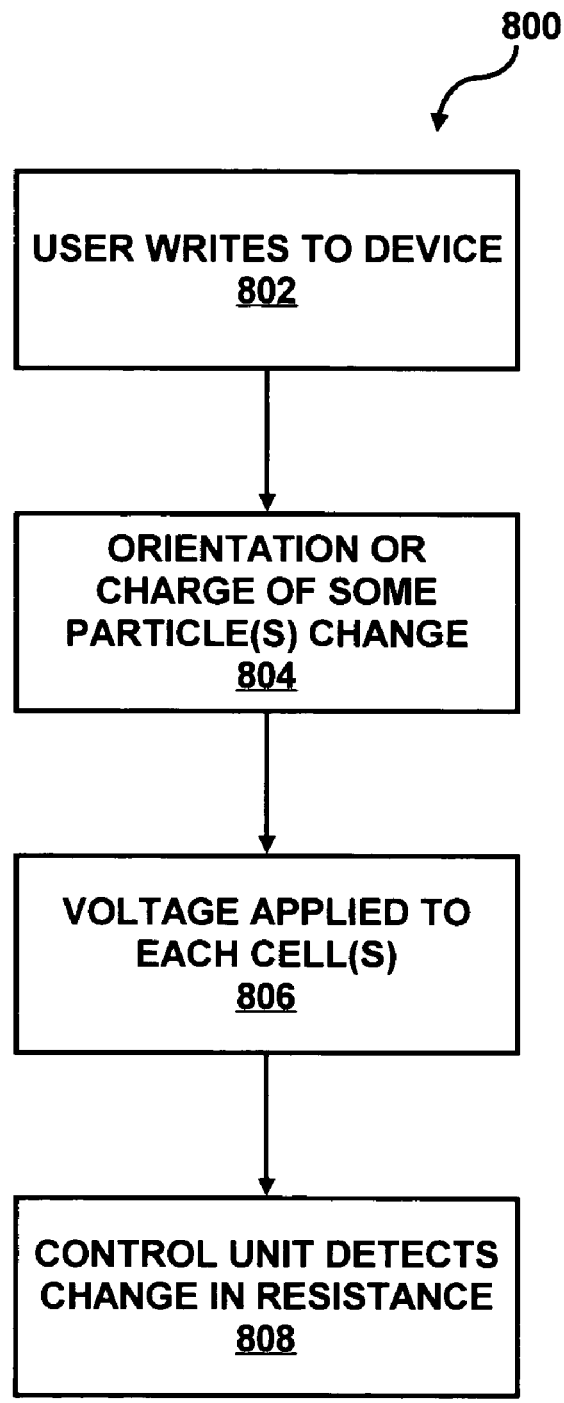
FIG. 8 shows a flow diagram of another operational mode in accordance with an example.

FIG. 8 shows a flow diagram of an operational mode 800 depicting a manner in which an apparatus 100 may be implemented. The following description of the operational mode 800 is made with reference to the block diagram 600 illustrated in FIG. 6, and thus makes reference to the elements cited therein. The following description of the operational mode 800 is one manner in which the apparatus 100 may be operated. In this respect, it is to be understood that the following description of the operational mode 800 is but one manner of a variety of different manners in which such an apparatus may be operated.

In the operational mode 800, a user writes to a device having incorporated therein the apparatus 100 using the magnetic field generating device 610 or the electrostatic field generating device in step 802. The orientation of at least one of the particles in the layer of particles 606 changes in step 804. In step 806, the control unit 602 applies a voltage to at least one cell of the plurality of cells 604. The control unit 602 measures the current and detects a change in resistance to identify the changed particle. In one example, the control unit 602 applies a voltage to each cell of the plurality of cells 604, thus determining which particles were changed in the layer of particles 606 in step 808. In this manner, user input is detected and read. The information may then be sent to the device controller 612 or interpreted directly by the control unit 602.

Some of the steps illustrated in the operational modes 700 and 800 may be contained as a utility, program, subprogram, in any desired computer accessible medium. In addition, the operational modes 700 and 800 may be embodied by a computer program, which may exist in a variety of forms both active and inactive. For example, they may exist as software program(s) comprised of program instructions in source code, object code, executable code or other formats for performing some of the steps. Any of the above may be embodied on a computer readable medium, which include storage devices and signals, in compressed or uncompressed form.

Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running the computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that those functions enumerated below may be performed by any electronic device capable of executing the above-described functions.

What has been described and illustrated herein are the embodiments. The terms, descriptions and figures used herein are set forth by way of illustration only and are not meant as limitations. Those skilled in the art will recognize that many variations are possible within the spirit and scope of the embodiments, which intended to be defined by the following claims and their equivalents in which all terms are meant in their broadest reasonable sense unless otherwise indicated.

What is claimed is:

1. An input device, comprising:
   a plurality of MRAM cells, each including a sense layer having a changeable magnetic orientation and a reference layer having a pinned magnetic orientation; and
   a layer of particles including at least one particle spaced-apart from a sense layer of a first MRAM cell in said plurality of MRAM cells,
   wherein the at least one particle affects an orientation of a magnetic field of the sense layer of the first MRAM cell when a magnetic orientation of the at least one particle is changed.

2. The input device of claim 1, wherein the at least one particle emits a magnetic field with a changeable orientation that affects the orientation of the magnetic field of the sense layer of the first MRAM cell.

3. The input device of claim 2, wherein each of the plurality of MRAM cells further comprises a barrier layer extending between respective sense and reference layers within a corresponding MRAM cell.

4. The input device of claim 3, further comprising a control unit operable to measure a resistance of the first MRAM cell to determine a state of the at least one particle that is spaced-apart from the sense layer of the first MRAM cell.

5. The input device of claim 1, wherein the particles in said layer of particles are magnetic particles.

6. The input device of claim 5, further comprising a magnetic field generating device for altering an orientation of a magnetic field of one or more of the magnetic particles in said layer of particles when placed in proximity to said layer of particles.

7. The input device of claim 6, wherein the magnetic field generating device comprises an electromagnet having a polarity; and a switch for controlling the polarity of the electromagnet operable to apply a magnetic field to the one or more particles.

8. The input device of claim 5, wherein the magnetic particles have an electrostatic charge.

9. The input device of claim 8, further comprising an electrostatic field generating device for altering an orientation of a magnetic field of one or more of the magnetic particles when placed in proximity to the layer of particles.

10. The input device of claim 1, further comprising an integrated display having a plurality of pixels and wherein at least one of the pixels is directly controlled by at least one of said plurality of MRAM cells.

11. The input device of claim 1, further comprising an integrated display having a plurality of pixels and wherein at least one of the pixels is indirectly controlled by at least one of said plurality of MRAM cells.

12. The input device of claim 1, wherein said layer of particles provide non-volatile data storage that is magnetically coupled to non-volatile data storage provided by said plurality of MRAM cells.

13. The input device of claim 12, further comprising an initializer to apply a voltage to the layer of particles to erase data stored in the layer of particles.

14. A non-volatile input memory device, comprising;
    a layer of particles operable to non-volatility store input information; and
    a plurality of MRAM cells that are magnetically coupled to the layer of particles, but are electrically insulated from the layer of particles, wherein at least one cell of the plurality of MRAM cells reads the input information stored in at least a portion of the layer of particles.

15. The non-volatile input memory device of claim 14, wherein at least one of the plurality of MRAM cells includes a barrier layer having a magnetic tunnel junction.

16. The non-volatile input memory device of claim 14, wherein at least one of the particles in the layer of particles has an electrostatic charge.

17. The non-volatile input memory device of claim 14, wherein the at least a portion of the layer of particles is operable to receive the input information from a user input device.

18. The non-volatile input memory device of claim 14, further comprising a display having a plurality of pixels and wherein at lease one of the pixels is directly controlled by the input information stored in the layer of particles.

19. The non-volatile input memory device of claim 14, further comprising a display having a plurality of pixels and wherein at least of the pixels is indirectly controlled by the input information stored in the layer of particles.

20. The non-volatile input memory device of claim 14, further comprising an initializer operable to erase the input information stored in the layer of particles.

21. The non-volatile input memory device of claim 14, wherein at least one of the plurality of MRAM cells includes a reference layer having a pinned magnetic orientation, a barrier layer adjacent to the reference layer, and a sense layer adjacent to the barrier layer, the sense layer having a changeable magnetic orientation.

22. A method of operating an input device having a layer of particles therein, each particle having a magnetic orientation, the layer of particles overlaying a plurality of MRAM cells having respective sense and reference layers therein, the method comprising: changing the magnetic orientation of at least one particle in the layer of particles; providing a voltage to at least one of the plurality of MRAM cells wherein the at least one MRAM cell is substantially underlying the at least one particle; and detecting a change in resistance of the at least one MRAM cell in response to said changing the magnetic orientation of the at least one particle in the layer of particles.

23. The method according to claim 22, further comprising activating a pixel of a display in response to the detection of the change in resistance of the at least one MRAM cell.

24. The method according to claim 22, further comprising: receiving a magnetic field at the layer of particles, wherein the magnetic field is generated by a magnetic field generator and changes the magnetic orientation of the at least one particle.

25. The method according to claim 22, further comprising initializing the apparatus by aligning the magnetic orientation of each particle of the layer of particles in substantially one direction.

26. The method according to claim 25, wherein initializing includes providing a voltage to the layer of particles.

27. The method according to claim 25, wherein initializing includes providing an external magnetic field to the layer of particles.

28. The method according to claim 22, wherein each of the plurality of MRAM cells includes a sense layer having a changeable magnetic orientation and a reference layer having a pinned magnetic orientation; and wherein the step of changing the magnetic orientation of at least one particle in the layer of particles causes the magnetic orientation of the sense layer to change.

29. The method according to claim 22, further comprising: receiving an electrostatic field at the layer of particles, wherein the electrostatic field is generated by an electrostatic field generator and changes the magnetic orientation of the at least one particle.

30. An apparatus having a layer of particles, each particle having a magnetic orientation, the layer of particles overlaying and spaced-apart from a plurality of MRAM cells so that the layer of particles and the plurality of MRAM cells are electrically isolated from each other, the apparatus comprising:

means for changing the magnetic orientation of at least one particle in the layer of particles;
means for providing a voltage to at least one of the MRAM cells; and
means for detecting a change in resistance of the at least one of the MRAM cells located under the at least one particle, the change in resistance in response to the change of the magnetic orientation of the at least one particle.

31. The apparatus of claim 30, further comprising means for activating a pixel of a display in response to the detection of the change in resistance of one of the MRAM cells.

32. The apparatus of claim 30, further comprising means for aligning the magnetic orientation of each particle in the layer of particles in substantially one direction.

33. The apparatus of claim 30, wherein the at least one of the MRAM cells further comprises sense means responsive to the magnetic orientation of at least one particle in the layer of particles.

34. A non-volatile data input device, comprising:
an array of MRAM cells having sense layers therein that are switchable between multiple magnetic field orientations and reference layers having pinned magnetic orientations; and
a layer of magnetic particles suspended in a medium disposed on said array of MRAM cells, said layer having a sufficient density of magnetic particles therein to induce non-volatile magnetic coupling between a plurality of the magnetic particles and a corresponding plurality of the sense layers; and
wherein the layer of magnetic particles are electrically insulated from the sense layers in said array of MRAM cells.

35. The device of claim 34, wherein the non-volatile magnetic coupling between a first sense layer and at least one of the magnetic particles disposed opposite the first sense layer is of sufficient strength to cause a change in the magnetic field orientation of the first sense layer in response to a change in orientation of the at least one of the magnetic particles.

36. The device of claim 35, further comprising an initializer configured to erase non-volatile data stored in said layer of magnetic particles.

37. The device of claim 34, wherein each of the plurality of magnetic particles has an electrostatic charge associated therewith.

38. The device of claim 34, wherein said layer of magnetic particles is configured to support a non-volatile reorientation of magnetic particles therein in response to movement of a stylus across the medium.

39. The device of claim 34, further comprising respective pairs of conductors electrically coupled to each of a first plurality of MRAM cells in said array of MRAM cells, said pairs of conductors configured to support the passing of read currents through the first plurality of MRAM cells to thereby determine logic states of the first plurality of MRAM cells; and wherein said layer of magnetic particles are electrically insulated from said pairs of conductors during said passing of the read currents.

* * * * *